(12) United States Patent
Trivedi et al.

(10) Patent No.: US 10,419,313 B2
(45) Date of Patent: Sep. 17, 2019

(54) INDUSTRIAL NETWORK MONITORING

(71) Applicant: General Electric Company, Schenectady, NY (US)

(72) Inventors: Kavyesh Trivedi, Greenville, SC (US); Robert Haley, Greenville, SC (US); Barry Littlefield, Greenville, SC (US); Lester Childs, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/826,231

(22) Filed: Nov. 29, 2017

(65) Prior Publication Data

US 2019/0166025 A1    May 30, 2019

(51) Int. Cl.
*H04L 12/26* (2006.01)
*H04L 12/24* (2006.01)
*H04L 29/08* (2006.01)

(52) U.S. Cl.
CPC .......... *H04L 43/0823* (2013.01); *H04L 41/06* (2013.01); *H04L 41/0681* (2013.01); *H04L 43/062* (2013.01); *H04L 67/12* (2013.01)

(58) Field of Classification Search
None
See application file for complete search history.

(56) References Cited

U.S. PATENT DOCUMENTS

| | | |
|---|---|---|
| 8,194,589 B2 | 6/2012 | Wynn et al. |
| 8,554,830 B2 | 10/2013 | Wynn et al. |
| 8,880,664 B1 | 11/2014 | Tekle et al. |
| 9,113,358 B1 | 8/2015 | Lachwani et al. |
| 9,504,070 B2 | 11/2016 | Gupta et al. |
| 2010/0218108 A1* | 8/2010 | Crabtree ................ G06Q 50/06 715/738 |

(Continued)

FOREIGN PATENT DOCUMENTS

| | | |
|---|---|---|
| EP | 2206278 B1 | 11/2014 |
| EP | 2887577 A1 | 6/2015 |

(Continued)

OTHER PUBLICATIONS

Da Costa et al. (2017). Bayesian Ontologies in AI Systems (8 pages).

(Continued)

*Primary Examiner* — Phirin Sam
(74) *Attorney, Agent, or Firm* — Eversheds Sutherland (US) LLP

(57) ABSTRACT

This disclosure relates to systems and methods for industrial network monitoring. In one embodiment of the disclosure, a method includes acquiring, by a plant server communicatively coupled to at least one switch of the data network associated with plant components, traffic data flowing through the data network. The method further includes performing, by the plant server, an analysis of the traffic data to generate a network profile. The method may further include monitoring, by the plant server, traffic data flowing through the data network. While monitoring the traffic data, the method may determine, by the plant server, a deviation of the traffic data from the network profile. The method may include issuing, by the plant server based on the deviation, at least one alarm concerning a health state of the data network.

20 Claims, 5 Drawing Sheets

(56) References Cited

U.S. PATENT DOCUMENTS

| | | | |
|---|---|---|---|
| 2013/0097233 | A1 | 4/2013 | Raman et al. |
| 2013/0238416 | A1 | 9/2013 | Richard |
| 2015/0088744 | A1 | 3/2015 | Raduchel |
| 2016/0203140 | A1 | 7/2016 | Paul |
| 2016/0226992 | A1 | 8/2016 | Akcin |
| 2016/0314129 | A1 | 10/2016 | Li |
| 2017/0041967 | A1 | 2/2017 | Gupta et al. |
| 2017/0237254 | A1* | 8/2017 | Meagher ............ G06F 17/5009 700/291 |
| 2017/0318053 | A1* | 11/2017 | Singh .................. H04L 63/1491 |
| 2018/0351857 | A1* | 12/2018 | Vairavakkalai ......... H04L 45/50 |
| 2018/0365193 | A1* | 12/2018 | Chattopadhyay ....... G06F 17/12 |

FOREIGN PATENT DOCUMENTS

| | | |
|---|---|---|
| WO | 2014/007812 A1 | 1/2014 |
| WO | 2014/018808 A1 | 1/2014 |

OTHER PUBLICATIONS

Gilmore et al., "Anomaly Detection and Machine Learning Methods for Network Intrusion Detection: an Industrially Focused Literature Review," Proceedings of the International Conference on Security and Management, SAM'16, 2016, pp. 292-298.

Heerden et al., "A computer network attack taxonomy and ontology," International Journal of Cyber Warfare and Terrorism (IJCWT), 2012, 2(3) (18 pages).

Identity-Based Application and Network Profiling: Using UAC in Conjunction with NSM, IDP and Infranet Enforcers Permits User-Identified Application and Network Profiling, Nov. 2007, Juniper Networks, pp. 1-12.

Jones et al., "Network Profiling with SiLK," CERT Network Situational Awareness Group, 2012, pp. 1-63.

Whisnant et al., "Network Profiling Using Flow," Software Engineering Institute, 2012, pp. 1-62.

* cited by examiner

INDUSTRIAL NETWORK MONITORING

TECHNICAL FIELD

The disclosure relates to monitoring plant equipment and, more specifically, to systems and methods for industrial network monitoring.

BACKGROUND

Monitoring of a network of an industrial plant is important to ensure continuous operation of the industrial plant. Early detection of anomalies associated with the network may help to avoid unexpected costs of maintenance of the industrial plant. Some anomalies are rare and can be hard to detect.

Furthermore, providing an immediate status of the network capabilities and infrastructure of the industrial plant can be helpful in determining minimum requirements for an upgrade or whether an installation of new software is needed.

Moreover, monitoring of the network of an industrial plant may be used to perform online screening analytic of vibration and electrical signatures.

SUMMARY OF THE DISCLOSURE

This disclosure relates to systems and methods for industrial network monitoring. Certain embodiments of the disclosure can provide procedures for monitoring and diagnostics of electrical equipment of a plant based on analysis of data network. Some embodiments of the disclosure may facilitate early predictions of failures of electrical and mechanical plant equipment.

According to one embodiment of the disclosure, a system for industrial network monitoring is provided. The system may include a data network including at least one switch. The data network can be configured to communicatively couple components of a power plant. The system may further include a plant server communicatively coupled, via the data network, to the at least one switch. The plant server can be configured to acquire traffic data flowing through the data network. The plant server can be further configured to perform an analysis of the traffic data to generate a network profile. The plant server can be further configured to monitor further traffic data flowing through the data network. While monitoring the further traffic data, the plant server can determine a deviation of the further traffic data from the network profile. The plant server can be further configured to issue, based on the deviation, at least one alarm concerning a health state of the plant components.

In some embodiments of the disclosure, the analysis of the traffic data may include at least one of the following: a semantic-based analysis, a statistical learning, a pattern recognition, a regression, and clustering and classification.

In some embodiments of the disclosure, the traffic data may include Internet protocol (IP) addresses. The deviation may include a change in the IP addresses.

In some embodiments of the disclosure, the traffic data may include broadcast data.

In some embodiments of the disclosure, the traffic data may include operational parameters reported by the at least one of plant components. In certain embodiments of the disclosure, the deviation may include a relative change in the operational parameters by a pre-determined percentage during a pre-determined time interval.

In some embodiments of the disclosure, the deviation may include a change in a configuration of the data network.

In some embodiments of the disclosure, the deviation can be caused by at least one fault of the at least one switch.

In some embodiments of the disclosure, the plant components may include at least one of the following: a controller, a sensing device, an actuator, a human-machine interface, and a printer.

In some embodiments of the disclosure, the plant server can be further configured to determine that the deviation is systematic over a pre-determined time interval. In response to the determination that the deviation is systematic, the plant server can be further configured to perform analysis of the further traffic data to generate a further network profile and replace the network profile with the further network profile.

In some embodiments of the disclosure, the plant server can be further configured to define at least one operational schema to provide a graph-based semantic analysis of the at least one alarm.

According to another embodiment of the disclosure, a method for industrial network monitoring is provided. The method may include acquiring, by a plant server communicatively coupled to at least one switch of the data network associated with plant components, traffic data flowing through the data network. The method may include performing, by the plant server, an analysis of the traffic data to generate a network profile. The method may further include monitoring, by the plant server, further traffic data flowing through the data network. While monitoring the further traffic data, the method may further include determining, by the plant server, a deviation of the further traffic data from the network profile. The method may allow issuing, by the plant server, based on the deviation, at least one alarm concerning a health state of the data network.

Other embodiments, systems, methods, features, and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include systems and methods for industrial network monitoring. The disclosed systems and methods may allow monitoring network and computing utilization of an existing infrastructure of an industrial plant. Some embodiments of the disclosure may provide diagnostics and prognostics of network components and critical plant components that show anomalous behavior while operating within alarm limits. While some embodiments of the disclosure are described in reference to operations of equipment of a power plant, a similar technology can be practiced with other industrial plants.

In some example embodiments of the disclosure, a method for industrial network monitoring may include acquiring, by a plant server communicatively coupled to at least one switch of the data network associated with plant components, traffic data flowing through the data network. The method may include performing, by the plant server, an analysis of the traffic data to generate a network profile. The method may further include monitoring, by the plant server, further traffic data flowing through the data network. While monitoring the further traffic data, the method may determine, by the plant server, a deviation of the further traffic data from the network profile. The method may further allow issuing, by the plant server based on the deviation, at least one alarm concerning a health state of the data network.

Technical effects of certain embodiments of the disclosure may include eliminating a manual process of monitoring and diagnosing a network of an industrial plant and facilitate an early detection of issues of the network. Further technical effects of certain embodiments of the disclosure may provide an online insight into relatively important components of an industrial plant to improve reliability of the components and reduce maintenance costs. Yet further technical effects of certain embodiments of the disclosure may allow reducing unplanned shutdowns, forced outage time, and/or unplanned expenses.

The following provides a detailed description of various example embodiments related to systems and methods of industrial network monitoring.

Figure 1:
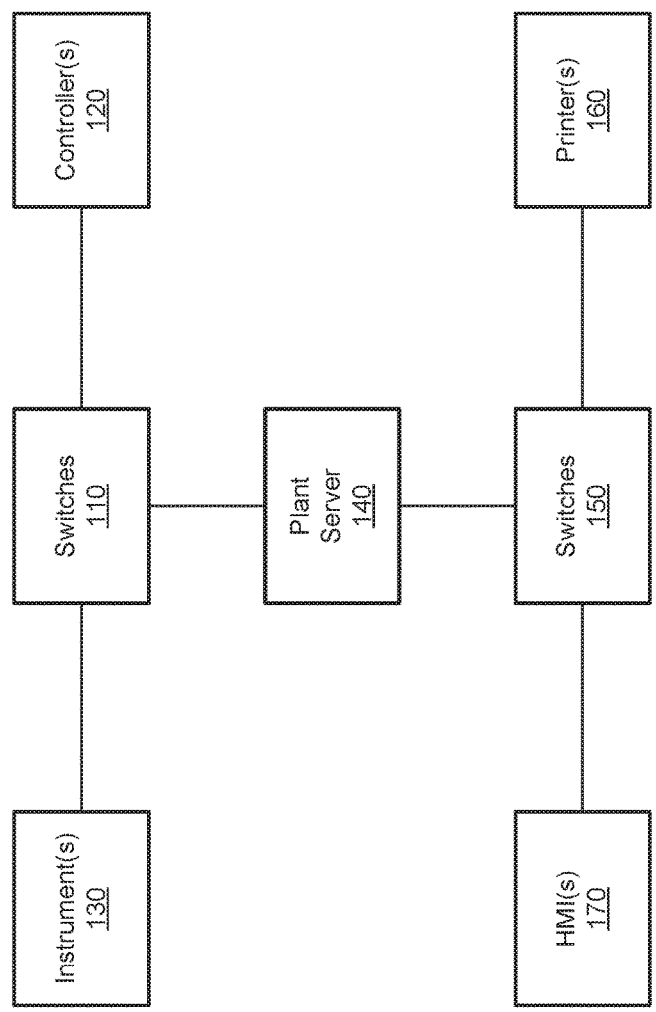
FIG. 1 is a block diagram illustrating an example system in which methods for industrial network monitoring can be implemented, according to certain embodiments of the disclosure.

Turning now to the drawings, FIG. 1 is a block diagram illustrating a system 100, in accordance with an example embodiment of the disclosure. In some embodiments, the system 100 may be a part of a plant (for example, an electric power plant). The system 100 may include one or more switches 110 and plant components (for example, instrument(s) 130 and controller(s) 120). The switches 110 may be configured to communicatively couple the instrument(s) 130 and the controllers 120.

In some embodiments of the disclosure, the instrument(s) 130 may include current meters, voltage meters, sensing devices for measuring vibrational and rotational data of rotating equipment, actuators, protective relays, circuit breakers, and so forth. In some embodiments of the disclosure, the instrument(s) 130 may provide operational data and broadcast the operational data via the switches 110.

In some embodiments of the disclosure, the controller(s) 120 may include intelligent electronic devices. The controller(s) 120 can be configured to read operational data from the instrument(s) 130. The controller(s) can be configured to generate commands, based on the operational data form instrument(s) 130. The controller(s) can be further configured to send the commands to one or more instruments 130, by, for example, broadcasting, via switches 110, messages including the commands and addresses of appropriate instruments 130.

The system 100 may further include human machine interface(s) (HMI(s)) 170, printer(s) 160, and switches 150. In further embodiments of the disclosure, the system 100 may include other elements such as router(s) and firewalls configured to control data flow and deliver data between plant components, HMI(s), printer(s) and so forth.

The system 100 may further include a plant server 140 which is communicatively coupled to the switches 110 and switches 150. The plant server 140 can be configured to monitor and analyze traffic data flowing through a data network. The data network may include at least one of switches 110 and/or at least one of switches 150. The traffic data may include IP addresses, operational data from the instruments 130, commands and alarm messages from controllers 120, request from HMI(s) 170, and so forth.

In some embodiments of the disclosure, the plant server 140 may be configured to generate, based on analysis of the traffic data, a network profile. The network profile may correspond to a normal network behavior. The network profile can be generated during one or more startups of the system 100, commissioning of the system 100, one or more shut downs of the system 100, and/or the base load of the system 100. In some embodiments of the disclosure, the analysis of the traffic data may include at least one of a semantic-based analysis, a statistical learning, a pattern recognition, a regression, and clustering and classification.

In some embodiments of the disclosure, the network profile may include a list of IP addresses of plant components and distribution of traffic data, normal values for operational parameters, switches' port numbers, and so forth, each of which can remain constant in time.

In some embodiments of the disclosure, the plant server 140 can be configured to monitor further traffic data flowing through the data network. The plant server 140 can be configured to detect deviation of the further data network from the network profile. The deviation may include a change in the list of IP addresses, change in distribution of traffic data, change in values of operational data, switches' port turning off and on, and so on.

Example 1

Figure 2:
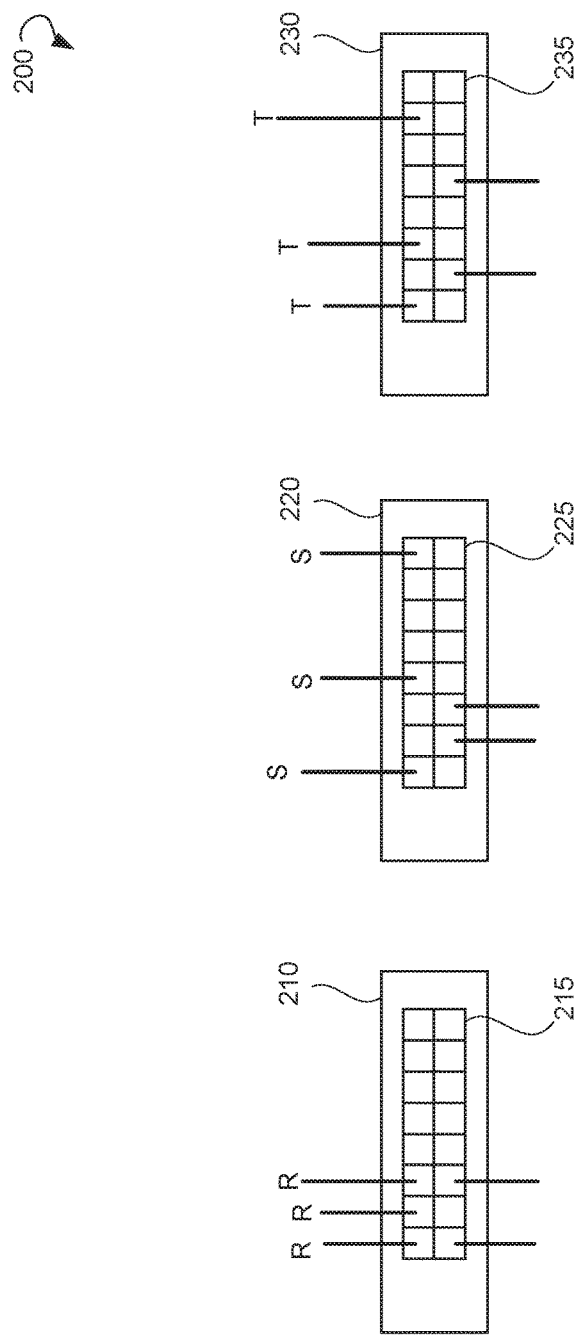
FIG. 2 is a block diagram showing example switch boards for connecting plant components, according to certain embodiments of the disclosure.

FIG. 2 is a block diagram illustrating an example set 200 of switch boards for connecting plant components, according to some embodiments of the disclosure. The set 200 may include at least switch board 210, 220, and 230. The switch boards 210, 220, and 230 can be used to provide three channels (R, S, and T) for connection between controller(s) 120 and instrument(s) 130. For example, the three channels (R, S, and T) can be used to provide connection between redundant controllers and one of the instruments.

The redundant controller may function in situations when the switch boards 210, 220, and 230 unpredictably reset due to, for example, power supply issues. If the switch boards are not reset simultaneously, it may not cause a trip or an error in the system 100 since at least one channel is present for delivering messages between the redundant controllers and the instrument. The failures of the switch boards may be imminent since the switch board may reset at the same time.

When a switch board is down, it causes a change in the broadcast data flowing through network. The change may include a disappearing IP address, which may cause deviation from a network profile. The plant server 140 may be configured to detect the deviation from the network profile caused by the disappearing or appearing of an IP address and issue a warning of a possible threat or failure present in network.

Example 2

In some embodiments, the traffic data may include data reported by a sensing device on a vibration level of plant equipment (for example, a support bearing of a rotor). One or more of the controller(s) 120 may be configured to read the data from the sensing device and issue an alarm if the vibrational level exceeds a pre-determined level. The alarm may not be triggered if, for example, the vibrational level is increasing by a significant relative change in short periods of times, while still being less than the pre-determined threshold. Such relative changes in vibrational level can be caused by incipient cracks of the rotor which, eventually, can grow to a bigger fracture. Early detection of the incipient cracks may help to avoid losses due to repair costs and unpredictable shutdown of the plant equipment.

The plant server 140 may be configured to detect deviation of data traffic from the network profile caused by a change in the vibrational level and issue an alarm regarding a health of the plant equipment.

Example 3

Changes of configuration in the system 100 may cause the systematic changes to data traffic flowing through the data network. The configuration change can be caused, for example, by change in software of HMIs 170. The plant server 140 may be configured to detect a presence of new configuration data in the data traffic. The plant server 140 may further be configured to determine, based on data traffic, a new network profile. The plant server may be further configured to compare the new network profile and current network profile to determine if the current network profile should be replaced with the new network profile.

In various embodiments of the disclosure, the plant server can be configured to run an operational schema (ontologies) for providing graph-based semantic analysis of alarms for relatively rare event patterns. The operational schema may enable a relatively fast response when the rare events occur.

In further embodiments of the disclosure, the operational schema may provide a decision for determining what is a normal network profile, what is a deviation from the normal network profile, and what is a shift of the normal network profile.

Figure 3:
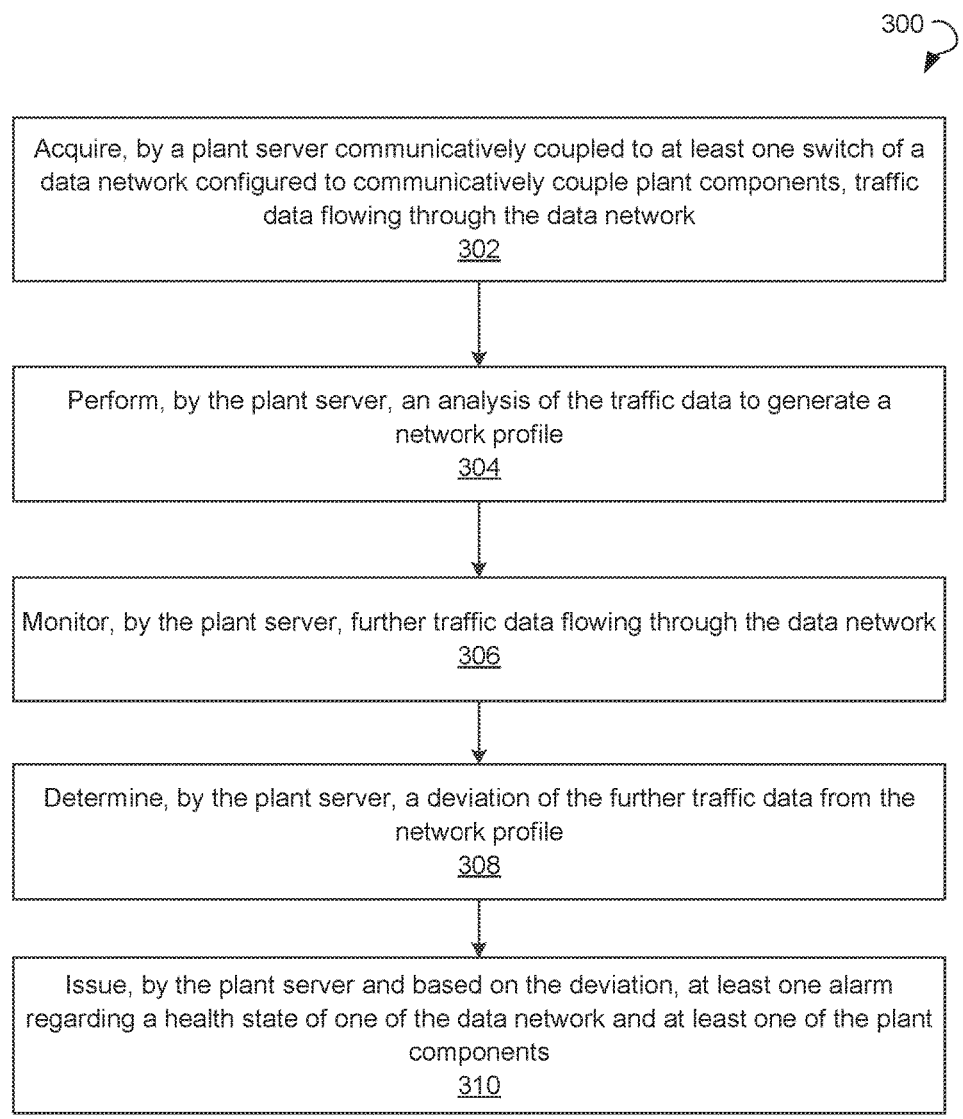
FIG. 3 is a flow chart illustrating an example method for industrial network monitoring, according to certain embodiments of the disclosure.

FIG. 3 is a flow chart illustrating an example method 300 for industrial network monitoring, according to some embodiments of the disclosure. The method 300 can be implemented by system 100 described above with reference to FIG. 1. In block 302, the method 300 may commence with acquiring, by a plant server communicatively coupled to at least one switch of the data network associated with plant components, traffic data flowing through the data network.

In block 304, the method 300 may include performing, by the plant server, an analysis of the traffic data to generate a network profile.

In block 306, the method 300 may include monitoring, by the plant server, further traffic data flowing through the data network.

In block 308, the method 300 may include, while monitoring the further traffic data, determining, by the plant server, a deviation of the further traffic data from the network profile.

In block 310, the method 300 may include issuing, by the plant server based on the deviation, at least one alarm concerning a health state of the data network.

Figure 4:
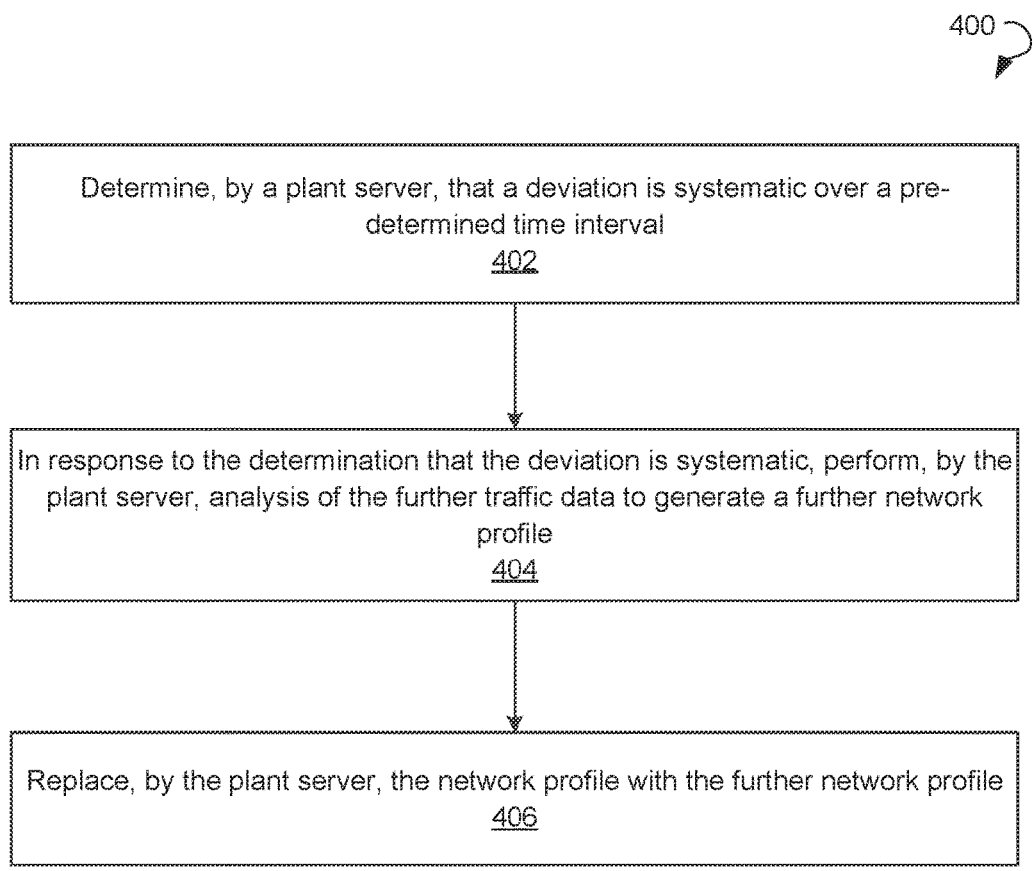
FIG. 4 is a flow chart illustrating an example method for regenerating a network profile, according to certain example embodiments of the disclosure.

FIG. 4 is a flow chart illustrating an example method 400 for regenerating a network profile, according to some example embodiments of the disclosure. The method 400 may provide additional operations of the method 300.

In block 402, the method 400 may commence with determining, by the plant server, that the deviation is systematic over a pre-determined time interval.

In block 404, the method 400 may include, in response to determination that the deviation is systematic, performing, by the plant server, analysis of the further traffic data to generate a further network profile In block 406, the method 400 may further include replacing the network profile with the further network profile.

Figure 5:
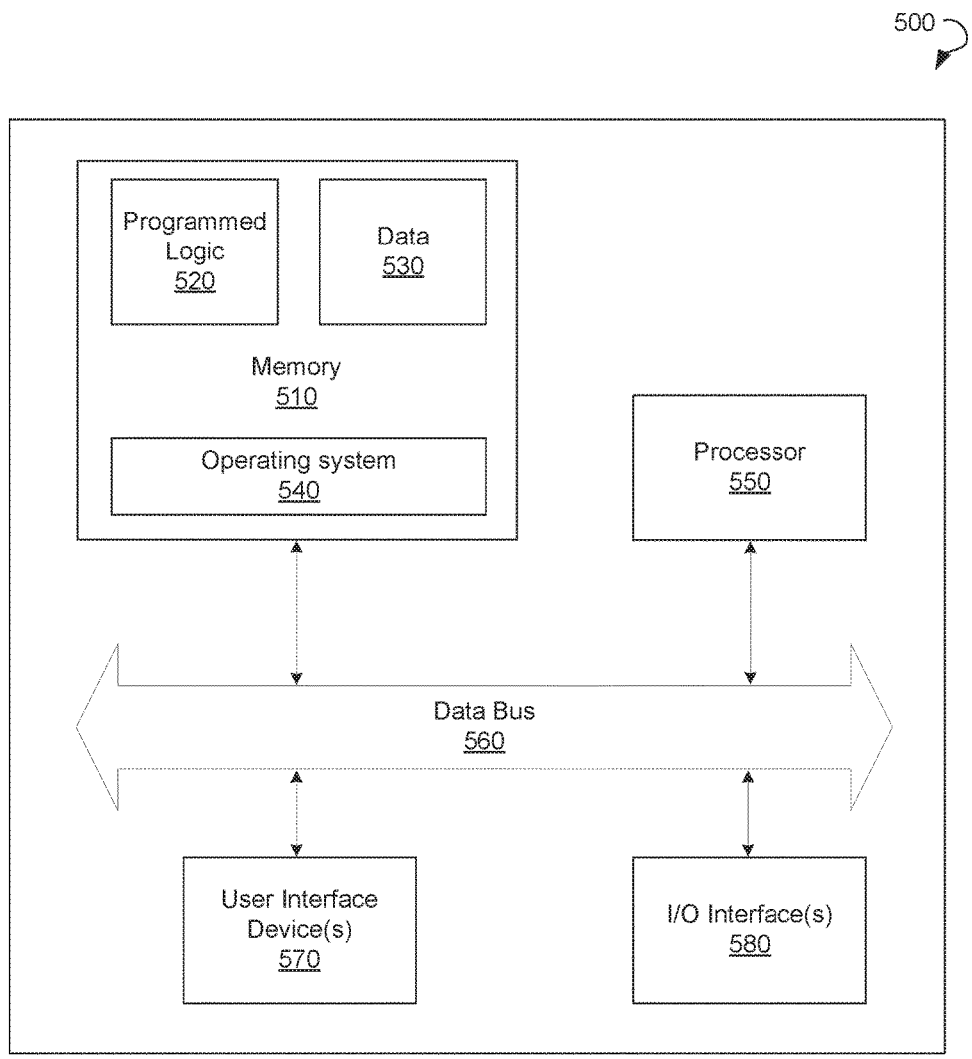
FIG. 5 is a block diagram illustrating an example controller, in accordance with a certain embodiment of the disclosure.

FIG. 5 depicts a block diagram illustrating an example plant server 500, in accordance with an embodiment of the disclosure. More specifically, the elements of the plant server 500 may be used to analyze network data associated with the system 100 while the system 100 is running. The plant server 500 may include a memory 510 that stores programmed logic 520 (e.g., software) and may store data 530, such as operational data associated with the system 100, a set of constants, and the like. The memory 510 also may include an operating system 540.

A processor 550 may utilize the operating system 540 to execute the programmed logic 520, and in doing so, may also utilize the data 530. A data bus 560 may provide communication between the memory 510 and the processor 550. Users may interface with the plant server 500 via at least one user interface device 570, such as a keyboard, mouse, control panel, or any other device capable of communicating data to and from the plant server 500. The plant server 500 may be in communication with other elements of the system 100 while operating via an input/output (I/O) interface 580. Additionally, it should be appreciated that other external devices or multiple other systems may be in communication with the plant server 500 via the I/O interface 580. In some embodiments of the disclosure, the plant server 500 may be located remotely with respect to the other elements of the system 100; however, in other embodiments of the disclosure, it may be co-located or even integrated with the system 100. Further, the plant server 500 and the programmed logic 520 implemented thereby may include software, hardware, firmware, or any combination thereof. It should also be appreciated that multiple plant servers 500 may be used, whereby different features described herein may be executed on one or more different plant servers 500.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    a data network including at least one switch, the data network being configured to communicatively couple components of a power plant; and
    a plant server communicatively coupled, via the data network, to the at least one switch, the plant server being configured to:
        acquire traffic data flowing through the data network;
        perform an analysis of the traffic data to generate a network profile;
        monitor further traffic data flowing through the data network; and
        while monitoring the further traffic data:
            determine a deviation of the further traffic data from the network profile; and
            based on the deviation, issue at least one alarm concerning a health state of the plant components.

2. The system of claim 1, wherein the analysis of the traffic data includes at least one of the following: a regression, and clustering and classification.

3. The system of claim 1, wherein:
    the traffic data includes Internet Protocol (IP) addresses;
    the deviation includes a change in the IP addresses, and
    wherein the plant server generates the network profile based on traffic data acquired during at least one of startup and shutdown.

4. The system of claim 1, further comprising at least one firewall communicatively coupled to the plant server, the at least one firewall controlling at least one data flow, wherein the traffic data includes broadcast data.

5. The system of claim 1, wherein:
    the traffic data includes operational parameters reported by at least one of the plant components; and
    the deviation includes a relative change in the operational parameters by a predetermined percentage during a pre-determined time interval.

6. The system of claim 1, wherein the deviation includes a change in a configuration of the data network, the system further comprising at least three switch boards communicatively coupled to the plant server, each switch board of the at least three switch boards comprising at least three redundant channels, each redundant channel of the at least three redundant channels communicatively coupling at least one controller to at least one instrument.

7. The system of claim 1, wherein the deviation is caused by at least one fault of the at least one switch,
    wherein the plant server detects at least one of a disappearing IP address and at least one reappearing IP address, and
    wherein the plant server issues a warning based on the at least one disappearing IP address and/or the at least one reappearing IP address.

8. The system of claim 1, wherein the plant components include a sensing device and at least one of the following: a controller, an actuator, a human-machine interface, and a printer, and
    wherein the sensing device comprises at least one of the following: a current meter, a voltage meter, and a sensing device for measuring vibrational and rotational data of rotating equipment.

9. The system of claim 1, wherein the plant server is further configured to:
    determine that the deviation is systematic over a pre-determined time interval; and
    in response to the determination that the deviation is systematic, perform analysis of the further traffic data to generate a further network profile; and
    replace the network profile with the further network profile.

10. The system of claim 1, wherein the plant server is further configured to define at least one operational schema to provide a graph-based semantic analysis of the at least one alarm, and
    wherein the plant server is configured to detect at least one difference in network profile due to a change in HMI software installed on the at least one plant server.

11. A method for monitoring a data network, the method comprising:
    acquiring, by a plant server communicatively coupled to at least one switch of the data network associated with plant components, traffic data flowing through the data network;
    performing, by the plant server, an analysis of the traffic data to generate a network profile;
    monitoring, by the plant server, further traffic data flowing through the data network; and
    while monitoring the further traffic data:
        determining, by the plant server, a deviation of the further traffic data from the network profile; and issuing, by the plant server based on the deviation, at least one alarm concerning a health state of the data network.

12. The method of claim 11, wherein the analysis of the traffic data includes at least one of the following: a semantic-based analysis and a statistical learning.

13. The method of claim 11, wherein:
the traffic data includes Internet Protocol (IP) addresses;
the deviation includes a change in the IP addresses, and
wherein the plant server generates the network profile based on traffic data acquired during at least one of commissioning and base load operation.

14. The method of claim 11, wherein the traffic data includes broadcast data.

15. The method of claim 11, wherein:
the traffic data includes operational parameters reported by at least one of the plant components;
the deviation includes a relative change in the operational parameters by a pre-determined percentage during a pre-determined time interval, and
wherein the traffic data comprises sensing device vibration data of at least one piece of plant equipment.

16. The method of claim 15, wherein the deviation includes a change in a configuration of the data network, and
wherein the at least one piece of plant equipment further comprises at least one support bearing of a rotor.

17. The method of claim 11, wherein the deviation is caused by at least one fault of the at least one switch.

18. The method of claim 11, wherein the plant components include a sensing device and at least one of the following: a controller, a sensing device, an actuator, a human-machine interface, and a printer, and
wherein the sensing device comprises at least one of the following: an actuator, a protective relay, and a circuit breaker.

19. The method of claim 11, further comprising:
determining, by the plant server, that the deviation is systematic over a pre-determined time interval;
in response to the determination that the deviation is systematic, performing, by the plant server, an analysis of the further traffic data to generate a further network profile; and
replacing, by the plant server, the network profile with the further network profile.

20. A system for network monitoring, the system comprising:
plant components including at least one controller, a sensing device, an actuator, and a human-machine interface;
at least one switch in communication with a data network configured to communicatively couple the plant components; and
a plant server communicatively coupled to the at least one switch, the plant server being configured to:
acquire traffic data flowing through the data network, the traffic data including at least Internet Protocol (IP) addresses and broadcast data;
perform an analysis of the traffic data to generate a network profile;
monitor further traffic data flowing through the data network; and
while monitoring the further traffic data:
determine a deviation of the further traffic data from the network profile; and
issue, based on the deviation, at least one alarm regarding a health state of one of the data network and at least one of the plant components.

* * * * *